Feb. 7, 1939.                A. W. FRANKLIN                2,146,062
                        AUTOMATIC INDEXING DEVICE
                    Filed Aug. 6, 1937            2 Sheets-Sheet 1

INVENTOR.
Albert W. Franklin

Darby & Darby
ATTORNEYS.

Feb. 7, 1939.　　　A. W. FRANKLIN　　　2,146,062
AUTOMATIC INDEXING DEVICE
Filed Aug. 6, 1937　　　2 Sheets-Sheet 2

INVENTOR.
Albert W. Franklin
BY Darby & Darby
ATTORNEYS.

Patented Feb. 7, 1939

2,146,062

UNITED STATES PATENT OFFICE 2,146,062

AUTOMATIC INDEXING DEVICE

Albert W. Franklin, New York, N. Y.

Application August 6, 1937, Serial No. 157,691

12 Claims. (Cl. 74—10)

This invention relates to improvements in indexing or positioning devices such as are now commonly employed in connection with the tuning devices of radio receiving sets.

An object of this invention is to provide an automatically operating positioning mechanism for use in conjunction with the tuning devices of radio sets by means of which those tuning devices may be accurately and automatically set to a predetermined position.

A further object of the invention is to provide a device of this nature capable of use in combination with any device to be adjusted or operated by means of which it may be adjusted or operated accurately to predetermined positions.

A further object of this invention is to provide a mechanism of this nature capable of adjustment whereby its automatic indexing function may be adjusted to cover the full range of operation of which the mechanism is capable.

A further object of the invention is to provide an automatic indexing mechanism for use for the control of devices which only have a range of movement of 180 degrees, and yet by means of which the device may be indexed to any position in its range of movement by means of the indexing mechanism.

A further object of the invention is to provide an exceedingly simple and rugged form of construction.

These and many other objects as will appear from the following disclosure are secured by means of this invention.

This invention resides substantially in the combination, construction, arrangement and relative location of parts, all in accordance with the disclosure herein.

In the accompanying drawings.

Figure 2:
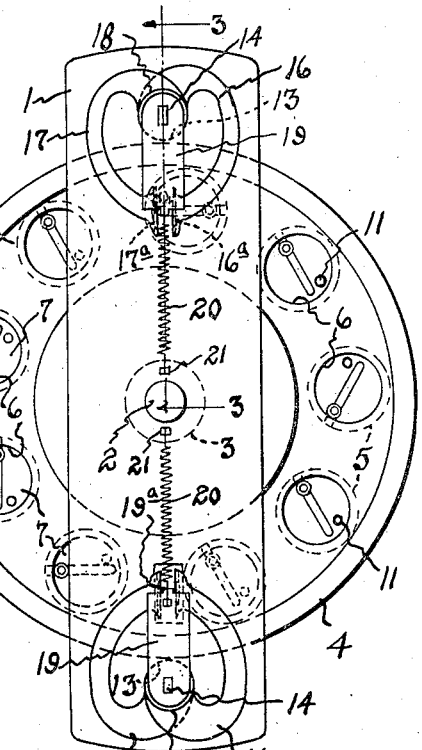
Fig. 2 is a rear elevational view thereof.
Figure 3:
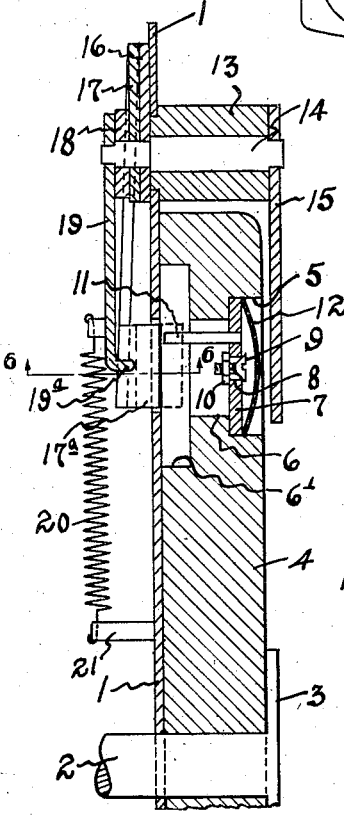
Fig. 3 is an enlarged cross sectional view of a portion thereof taken on the line 3—3 of Fig. 2.

The nature and function of the structure will be more quickly understood by describing it in detail. Referring to the drawings the form illustrated in Figs. 1 to 3 inclusive, include a plate or base 1 of any suitable material, such as metal through which the shaft 2 extends. In front of the base is a disc 4 of any suitable material such as metal, insulating material, and the like through which the shaft 2 extends. The shaft 2 is connected to the disc 4 for rotation therewith and is provided with a terminal head 3 as shown. The shaft of course is free to rotate in the support 1. This shaft is to be connected to, or is a shaft of any device, the position of which it is desired to control by means of the mechanism of this invention. For example, in the case of its use in connection with a radio receiving set, the shaft 2 would be the shaft of the tuning device such as the tuning condenser, or the shaft of the mechanism which controls the tuning condenser. The plate 1 is intended to be mounted upon or inset into any available support and secured thereto. For example, in the case of a radio receiving set, this would be the front wall or panel of the set cabinet. It will be seen then with this set up that when the disc 4 is rotated, the shaft will turn with it as well as any mechanism connected to the shaft.

The disc 4 is provided with a series of holes therethrough which as shown, consist of portions of different diameter as indicated at 5, 6, and 6'. See Fig. 3. Lying in the bottom of the recess 5 against the shoulder formed by the smaller passage 6 is a disc 7 of any suitable material such as metal which has a fairly snug or tight fit with the wall of the recess 5 and yet is free enough so that it may be turned. The disc is provided with a diametrical slot 8 which extends all the way from one edge to a point near the opposite edge. In this slot toward the open end is mounted a conically headed screw 8 provided with a nut 10 positioned at the back of the disc 7. When the screw 8 is tightened down its conical head connecting in the slot 8 expands the disc 7 sufficiently to lock it in the recess 5. When the screw 8 is loosened the disc 7 is free so that when a screw-driver is placed in the slot 8, the disc may be rotated.

Mounted in the disc 7 and projecting towards the back of disc 4, is a stop pin 11 which is secured in the disc 7 in any suitable manner as by riveting over soldering threads or the like. As is clear from the drawings these stop pins are placed to one side of the center of the disc 7 so that when the discs are rotated the pins move in a circular path.

It should be noted that there are an odd number of these discs none of which are exactly diametrically opposed, which fact, in combination with the sweep of the stop pins 11, when adjusted in their circular path, makes it possible to adapt the apparatus so that at any position of the device being controlled, such as a tuning condenser throughout, its full range of movement may be automatically selected. It will of course be apparent that this characteristic of the device may be accomplished substantially without necessarily employing an odd number of discs 7 and stop pins 11. This feature will be referred to again later.

As indicated clearly in the figures, the disc 7 may be covered by means of a disc 12 of any suitable material, such for example as Celluloid which is so proportioned that it may be snapped in the recess 5 thereby covering up the mechanism exposed therein. The discs 12 may have printed on them, or be adapted to have marked thereon indicating indicia corresponding to the setting controlled by that particular position, as for example, a radio broadcast station designating letters.

Positioned on the base 1 in diametrically opposed relation adjacent the periphery of the disc 4 are a pair of standards 13 which may be secured to the base in any suitable manner, as for example, by means of threads soldering, brazing, welding and the like. These standards 13 have a bore therethrough in which is rotatably mounted the shaft 14. Secured to the upper end of the shaft is an arm 15 which overlies the disc 4 as clearly indicated in the drawings.

At the rear end of each shaft 14 are a pair of spring members 16 and 17, preferably of the shape shown, on top of which lies a washer 18. Secured to the shaft 14 is an arm 19 which in turn overlies the washer 18. In other words the arms 15 and 19 are secured to the shaft 14 for rotation therewith. The springs 16 and 17 are held in place under the washer 18 and extend upwardly away from the plane of their ends under the washer 18 as is clear from Fig. 3. The terminal ends of the springs 16 and 17 are provided with tabs 16a and 17a respectively which project towards the stop pins 11 in the normal position of the springs. As is clear from Fig. 3, these tabs are out of the path of the movement of the stop pins 11 when the disc 4 is revolved. The end of arm 19 is provided with a tab 19a projecting towards the stop pins 11 and in the same direction as the tabs 16a and 17a as is clear from Fig. 3. As will be seen from Fig. 2, the tab ends of springs 16 and 17 approach towards each other but terminate in spaced relation so that the projection 19a lies between them, and in the position shown in Fig. 3. This is the normal position of these parts.

A coil spring 20 is secured at one end to a lug on the arm 19 near its free end and at the other end to a lug or pin 21 secured to the base 1. As is clear from Fig. 2 the mechanism being described, is the same at both sides of the disc, and springs 20 normally hold the mechanism in the position shown.

Figure 1:
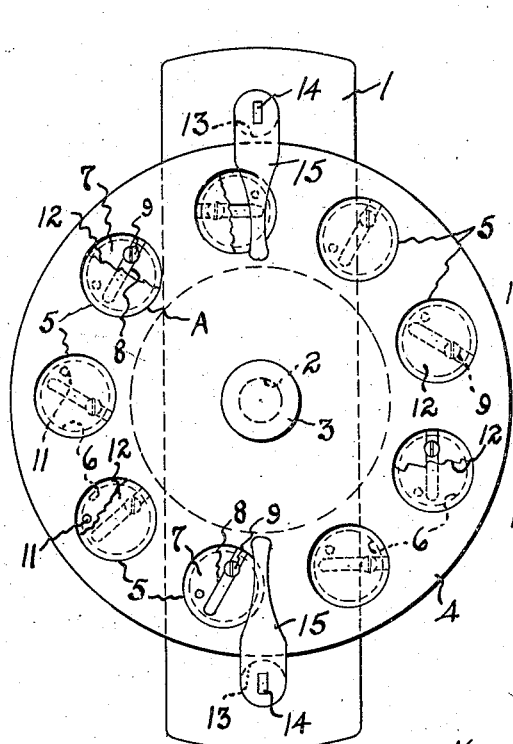
Figure 1 is a front elevational view of one form of device in accordance with this invention with some parts broken away.

In the operation of the device let it be assumed that the position marked "A", Figure 1, represents in the case of a radio receiving set, a particular station desired. The operator engages the disc 4 at the recess 5 of position A with his finger, and rotates the disc 4 in a clockwise direction, Figure 1, until his finger strikes the upper lever 15. Further movement of the disc 4 by his finger causes lever 15 to rotate on the axis of shaft 14 in a counterclockwise direction carrying shaft 14 with it as well as lever 19. This movement of lever 19 causes its projection 19a to ride up on top of the free end of spring 17 depressing it to the dotted line position, Fig. 3, so as to be in the path of travel of the stop pin 11. This movement of the spring 17 occurs just as the stop pin moves up to a position to engage the tab 17a. When engagement occurs the disc 4 can be moved no further. At this time the mechanism being adjusted and connected to shaft 2, is adjusted to the position corresponding to position A on the disc or dial 4. This is so because by previous adjustment the stop pin 11 has been swung around to produce this result. Every time the finger is engaged in position A of the dial and rotated up to the lever 15, the dial will be brought to a stop by engagement of one of the tabs of springs 16 and 17 with stop pin 11. If, for example, position A happens to be around on the other side of the upper lever 15, Figure 1, the dial 4 is simply moved into the reverse direction until the finger engages the upper arm 15 whereupon spring 16 will be depressed so that its tab 16a moves into the path of the stop pin 11 to bring the dial and connected parts to rest in exactly the correct position.

Arrangements of this type are often used, as for example in the case of radio receiving sets, with condensers whose full range of movement is 180 degrees. When the dial is directly connected to the condenser it likewise can only have a movement through an arc of 180 degrees. In order to make it possible to index the condenser to any position in its range of movement with such an arrangement, the positions here described as finger positions must be arranged with respect to each other, so as not to be diametrically opposed and a pair of stops diametrically opposed, as shown, are employed which, together with the feature of adjustability of the stop pins 11, make it possible to get indexing at any point in the full 180 degree range without a complete rotation of the dial. Thus, for example, the positions A or their equivalents for say the upper half of the dial cooperate with the upper stop mechanism of the remaining positions, that is those of the lower half cooperate with the other stop mechanism. To make the operation of this arrangement apparent it is desirable that the levers 15 be given different designating colors and the discs 12 are respectively given the same designating colors, so that for example if the upper lever is white the discs at the positions which cooperate with it are white, and if the lower lever is black the discs which cooperate with it are black.

It will be apparent that this feature of the invention may be employed with other forms of stop mechanism, as for example the type now commonly employed where a button corresponding to one of the positions A is depressed against the resistance of a spring and the dial rotated until a fixed stop is engaged. With such a known arrangement, if two fixed stops are used and the buttons for one-half the dial cooperate with one stop, and the other patents cooperate with the other, it is apparent that the mechanism operated thereby may be indexed to any desired position in a 180 degree range.

Figure 4:
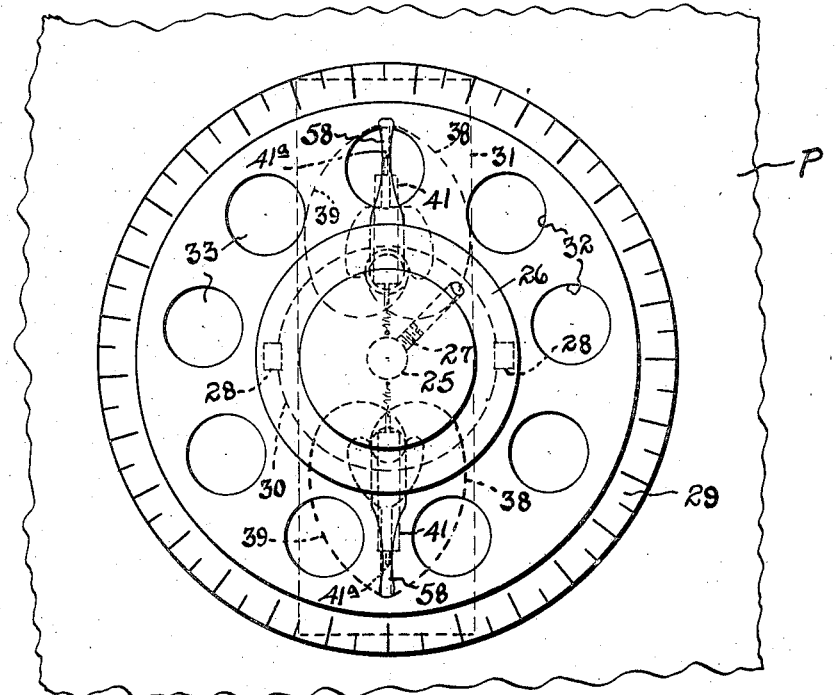
Fig. 4 is a front elevational view of a modified form of device in accordance with this invention.
Figure 6:
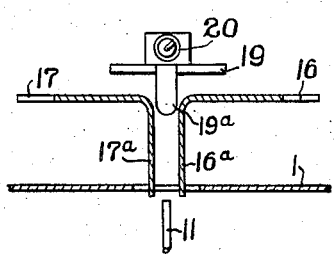
Fig. 6 is a cross sectional view taken on the line 6—6 of Fig. 3.
Figure 5:
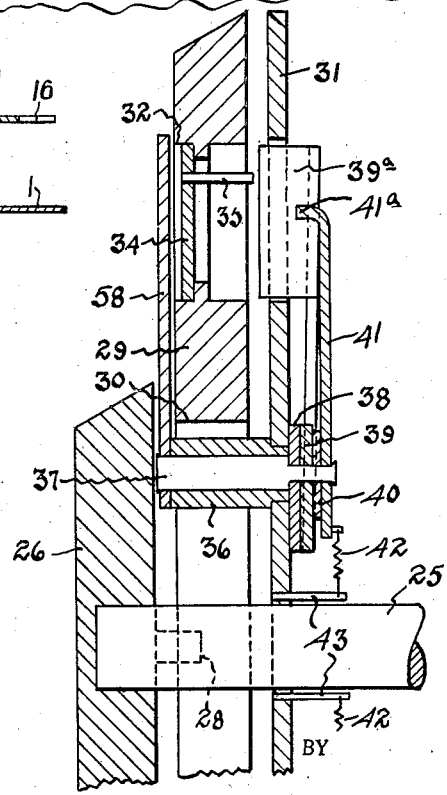
Fig. 5 is a cross sectional view similar to that of Fig. 3 of a portion of the device of Fig. 4.

The mechanism of Figs. 4 and 5 is basically the same as that previously described, but shows some of the parts in reverse position so as to make the device more compact. In this case the support such as the panel of a radio receiving set is diagrammatically indicated at P. Mounted on this support in any suitable manner is the base plate 31. At 25 is the operating shaft for the device to be controlled extending through the base plate and having on its outer end a knob 26 secured thereto by the set screw 27. This knob is provided with a pair of projections 28 on its rear face. At 29 is the dial corresponding to the dial 4 of the previous arrangement which has a large central aperture 30 on the circumference of which are a pair of recesses positioned to receive the projections 28 which may be detachably secured therein in any suitable manner. This supports the dial 29 from the knob 26 and by means of it on the shaft 25 for rotation with it.

The dial 29 has a series of positions on it resulting from the holes 32 distributed concentrically thereon, and providing a place for the discs 34 corresponding to a disc 7 of the previous arrangement. These discs are constructed in exactly the same manner as those previously described, and may be covered with a disc 32 corresponding to the disc 12 of the previous arrangement. The disc 33 has been omitted from Fig. 5 for the purpose of clarity. The disc 34 is provided with stop pins 35 corresponding to the stop pins 11 of the previous arrangement.

In this arrangement the standards 36 which are mounted on the base 31 lie under the knob 26 and extend through the aperture 30 in the dial. Journaled in each standard 36 is the shaft 37 to one end of which is secured the lever 58 which corresponds to lever 15 of the previous arrangement. At the other end of shaft 37 are the flat springs 38 and 39 which are overlaid by the washer 49 on top of which lies the lever 41. Lever 41 is secured to the shaft 37 for rotation with it and terminates at its free end in the extension 41a. The leaf springs 38 and 39 terminate in the tabs of which one is shown at 39a in Fig. 5. The extension 41a lies between these tabs, which are similar to the tabs 16a and 17a of the former structure, which extend towards the stop pin 35 but in their normal position as shown in Fig. 5 are out of the path of movement thereof. The other ends of the levers 41 are connected by the coil springs 42 to the pins 43 mounted in the base plate. The mechanism shown in Fig. 5 is only for the upper half of the device, the lower half being exactly the same as is clear from Fig. 4.

It will be seen that this mechanism is substantially like that of the previous arrangement and operates in the same way differing only in a physical rearrangement of the parts to render them more compact and possibly more sightly. It may be noted that the periphery of the dial 29 is beveled, and has marked thereon indicia common in radio dial and similar indexing devices.

From the above description it will be apparent to those skilled in the art that the principle and structure of this invention may be readily varied without departure from the true scope thereof. I do not, therefore, desire to be strictly limited to the disclosure for purposes of illustration but rather to the scope of the appended claims.

What I seek to secure by United States Letters Patent is:

1. In a mechanism as described, the combination including a rotatable actuator for a device to be controlled, a manual operator connected to said actuator for rotation therewith, a plurality of stop members mounted on said operator and means positioned adjacent said operator for engaging said stops respectively to bring said operator to rest at a predetermined position, said operator being actuated by the finger of the user, said means being in the path of movement of the finger.

2. In a mechanism as described, the combination including a rotatable shaft, a dial connected to said shaft for rotation therewith, a plurality of stop members mounted on said dial, a latch positioned for movement into the path of movement of said stop members and means connected to the said latch and positioned adjacent said dial whereby it is actuated to bring the dial to a stop when rotated by the finger of an operator.

3. In a mechanism as described, the combination including a rotatable shaft, a dial connected to said shaft for rotation therewith, a plurality of stop members mounted on said dial, a latch positioned for movement into the path of movement of said stop members and means connected to the said latch and positioned adjacent said dial whereby it is actuated to bring the dial to a stop when rotated by the finger of an operator, said latch being moved into the path of the stop members for either direction of movement of the dial.

4. In a mechanism as described, the combination including a rotatable shaft, a dial connected thereto having a plurality of finger positions, a stop member at each finger position, a latch member mounted adjacent the dial and projectable into the path of the stop member and means positioned adjacent said dial for actuating the latch member, said means being engageable by the finger of the operator when engaging the dial at a finger position, said stop members being adjustable to various positions within a range whereby the distance the dial moves with respect to each stop member may be varied.

5. In a mechanism as described, the combination including a rotatable shaft, a dial connected thereto having a plurality of finger positions, stop members secured to the dial, one for each finger position, a pair of latch members positioned adjacent the dial and means positioned to actuate the latch members respectively, said means being positioned with respect to the dial so as to be engageable by the finger of the operator when it engages the dial at a finger position.

6. In a mechanism as described, the combination including a rotatable shaft, a dial connected thereto having a plurality of finger positions, stop members secured to the dial, one for each finger position, a pair of latch members positioned adjacent the dial and means positioned to actuate the latch members respectively, said means being positioned with respect to the dial so as to be engageable by the finger of the operator when it engages the dial at a finger position, said stop members being adjustable whereby the dial may be brought to a stop by one of said latch members at any point in its range of movement.

7. In a mechanism of the type described, the combination including a rotatable shaft, a dial connected to said shaft having a plurality of finger positions, stop members secured to said dial, one for each finger position, and movable stop means positioned adjacent the dial for engaging the stop members, said movable stop means being actuated by engagement therewith by the finger of the operator when engaging the dial at a finger position and rotating it, said stop members being positionable each over a range whereby the dial may be brought to a stop at any point within the range of movement thereof.

8. In a device of the type described, the combination including a rotatable shaft, a dial secured to said shaft, a plurality of supports rotatably mounted in the dial, stop members eccentrically mounted on said supports, a latch member positioned to be moved into the path of said stop members, and means for actuating the latch member positioned adjacent the dial so as to be engageable by the finger of the operator when moving said dial.

9. In a device of the type described, the combination including a rotatable shaft, a dial secured to said shaft, a plurality of supports rotatably mounted in the dial, stop members eccentrically mounted on said supports, a latch member positioned to be moved into the path of said stop members, means for actuating the latch member positioned adjacent the dial so as to be engageable by the finger of the operator when moving said dial, and means for locking said supports in adjusted position.

10. In a mechanism of the type described, the combination including a rotatable member, an actuator mounted on said member, a plurality of equally spaced stop members mounted on said actuator so that no two of which are diametrically opposite each other, said stop members being adjustable through an angle of 360°, a pair of latch members positioned adjacent said dial, and means for holding the latch members out of and releasing them for movement into the path of movement of said stop members, said means being actuated by the finger of the operator when engaging the actuator to move it.

11. A combination as described comprising a rotatable actuator, a member connected thereto operative over a range of 180 degrees, a plurality of equally spaced stop members arranged on said actuator in the arc of a circle greater than 180 degrees so that no two of which are diametrically opposite each other, each of said stop members being adjustable to an angle greater than 180 degrees, a pair of diametrically opposed latch members positioned adjacent said actuator and normally out of the path of movement of said stop members, and means for respectively moving the latch members into the path of movement of the stop members when the actuator reaches predetermined positions.

12. A combination as described comprising a rotatable actuator, a member connected thereto operative over a range of 180 degrees, a plurality of equally spaced stop members arranged on said actuator in the arc of a circle greater than 180 degrees so that no two of which are diametrically opposite each other, each of said stop members being adjustable to an angle greater than 180 degrees, a pair of diametrically opposed latch members positioned adjacent said actuator and normally out of the path of movement of said stop members, and means positioned to be engaged by the finger of an operator when moving said actuator for respectively moving the latch members into the path of movement of the stop members.

ALBERT W. FRANKLIN.